US012144456B2

(12) United States Patent
Waggoner et al.

(10) Patent No.: US 12,144,456 B2
(45) Date of Patent: Nov. 19, 2024

(54) FILTRATION FOR CARTRIDGE BASED BEVERAGE FORMING SYSTEMS AND RELATED METHODS

(71) Applicant: Cirkul, Inc., Tampa, FL (US)

(72) Inventors: Garrett S. Waggoner, Tampa, FL (US); Andrew J. Gay, Bothell, WA (US); Thomas A. Urbanik, Maynard, MA (US); Cole Houston, Central Falls, RI (US); Corey Jerolmon, Boston, MA (US)

(73) Assignee: Cirkul, Inc., Tampa, FL (US)

( * ) Notice: Subject to any disclaimer, the term of this patent is extended or adjusted under 35 U.S.C. 154(b) by 435 days.

(21) Appl. No.: 17/106,053

(22) Filed: Nov. 27, 2020

(65) Prior Publication Data

US 2021/0169264 A1 Jun. 10, 2021

Related U.S. Application Data

(60) Provisional application No. 62/941,868, filed on Nov. 28, 2019.

(51) Int. Cl.
*A47J 31/44* (2006.01)
*A47J 31/00* (2006.01)
*B65D 81/32* (2006.01)

(52) U.S. Cl.
CPC ......... *A47J 31/4464* (2013.01); *A47J 31/005* (2013.01); *B65D 81/3216* (2013.01)

(58) Field of Classification Search
CPC .... A47J 31/005; A47J 31/605; A47J 31/4464; B65D 81/3216
See application file for complete search history.

(56) References Cited

U.S. PATENT DOCUMENTS 6,569,329 B1 * 5/2003 Nohren, Jr. .......... B01D 35/027
  210/489
9,795,242 B2 10/2017 Waggoner et al.
(Continued)

FOREIGN PATENT DOCUMENTS

CN 1675109 A 9/2005
CN 108514301 A 9/2018
(Continued)

OTHER PUBLICATIONS

PCT/US2020/062521 International Search Report and Written Opinion of the International Searching Authority dated May 7, 2021.
(Continued)

*Primary Examiner* — Thien S Tran
(74) *Attorney, Agent, or Firm* — Wolf, Greenfield & Sacks, P.C.

(57) ABSTRACT

A filtration system is adapted for use and integration with cartridge-based beverage dispensing systems that mix an additive (flavor) with a base liquid (water) as the base liquid is dispensed from a container and through the cartridge. A support frame may support an annular charcoal fabric filter element secured with an end cap and defining an inner cavity to house and surround a portion of the cartridge. A filter cage may enclose the filter element. The support frame may include a bayonet-type connector to secure the filter assembly to a container lid. Base liquid flowing from the container and through the cartridge necessarily flows first through the filter element as a user drinks from the container. Related methods for assembling the filter assembly and installing the filter assembly on a cartridge/lid assembly are also disclosed.

24 Claims, 10 Drawing Sheets

(56) References Cited

U.S. PATENT DOCUMENTS

| | | | |
|---|---|---|---|
| 9,801,492 B1 * | 10/2017 | Lin | A47J 31/0636 |
| 2009/0145839 A1 * | 6/2009 | Miga, Jr. | C02F 1/002 |
| | | | 210/466 |
| 2011/0278206 A1 | 11/2011 | Hull et al. | |
| 2012/0017766 A1 | 1/2012 | Anson et al. | |
| 2016/0150914 A1 | 6/2016 | Waggoner et al. | |
| 2017/0283134 A1 * | 10/2017 | Meyers | B65D 47/06 |
| 2019/0291029 A1 * | 9/2019 | Macdonald | B01D 29/56 |

FOREIGN PATENT DOCUMENTS

| | | | |
|---|---|---|---|
| CN | 109310231 A | 2/2019 | |
| WO | WO 00/09448 A1 | 2/2000 | |
| WO | WO 03/101858 A2 | 12/2003 | |

OTHER PUBLICATIONS

Extended European Search Report dated Nov. 30, 2023 in connection with European Application No. 20892410.0.
International Preliminary Report on Patentability mailed Jun. 9, 2022 in connection with International Application No. PCT/US2020/062521.
EP 20892410.0, Nov. 30, 2023, Extended European Search Report.
PCT/US2020/062521, Jun. 9, 2022, International Preliminary Report on Patentability.

\* cited by examiner

FILTRATION FOR CARTRIDGE BASED BEVERAGE FORMING SYSTEMS AND RELATED METHODS

RELATED APPLICATIONS AND PRIORITY CLAIM

This application claims priority to U.S. provisional application Ser. No. 62/941,868, filed on Nov. 28, 2019, titled FILTRATION FOR CARTRIDGE-BASED BEVERAGE FORMING SYSTEMS AND RELATED METHODS, the subject matter of which is incorporated by reference herein in its entirety.

FIELD

The instant disclosure relates generally to systems and methods for filtering liquids, such as water. More particularly, the instant disclosure relates to systems and methods for filtering a base liquid, particularly water, in cartridge-based beverage forming and dispensing systems.

BACKGROUND

There is an emerging advance in the art relating to beverage additive delivery systems and cartridge-based beverage systems, such as those described in US Patent Publication No. 20170296988, published on Oct. 19, 2017, titled ADJUSTABLE ADDITIVE CARTRIDGE SYSTEMS AND METHODS, the subject matter of which is incorporated herein by reference in its entirety. Such systems, owing to the unique features of the cartridges incorporated therein provide for the flavoring of a base liquid, typically water, with flavor concentrate or additive, in a controlled and adjustable fashion, as the base liquid is dispensed from a base liquid container, through the cartridge, and consumed by a user. Moreover, these systems, which are typically utilized in state-of-the-art portable hydration and beverage dispensing and flavoring systems, provide for the flavoring of the base liquid as the user dispenses the base liquid from the container, and prevent backflow of mixed beverage, thus leaving a remaining supply of unflavored base liquid in the container intact. Such systems typically utilize a flavor cartridge with innovative mixing and metering features that rely on predictable and consistent flow rates and pressures in the base liquid flow and in the flavor concentrate flow.

Some known filtration systems provide for the drip filtering of a supply of water into a pitcher, where a first reservoir is filled with unfiltered water and allowed to drip through a filter, such as a charcoal filter, into a second reservoir over time. Such pre-filtering of water, however, is not readily adaptable to state-of-the-art portable flavoring and hydration systems where consumers may not want to take the time to prefilter each supply of water contained in the system.

Consumers utilizing such systems may obtain their water from different sources, including supplies that may have an undesirable level of contaminants or additives, such as chlorine. It is therefore desirable to have filtration systems on portable hydration systems such as those described above.

Known filtration systems are not readily adaptable to state-of-the-art flavoring and hydration systems, such as those described above.

It would therefore be advantageous to provide systems and methods that address the aforementioned shortcoming and others in the prior art.

SUMMARY

Responsive to the foregoing challenges in the prior art, the instant disclosure provides various embodiments of a filtration system for use with a cartridge-based beverage dispensing system, and related methods.

Filtration systems according to one aspect of the disclosure may include a filter assembly that may support use and integration with a cartridge-based beverage dispensing system.

Filtration systems according to another aspect of the disclosure may provide for filtering of a base liquid, such as water, just prior to mixing with an additive and in such a manner that filtration and flavoring are performed on the flowing base liquid as the beverage is dispensed from the container and consumed by the user.

Filtration systems according to one aspect of the disclosure may provide filtration as a user dispenses base liquid from the container. The system may facilitate a "filter and flavor as you drink" delivery of a beverage when used in conjunction with a "flavor as you drink" mixing and dispensing systems, such as those described above. In this manner, the filter system is utilized only for the portion of the base liquid consumed by the user, thereby extending the life of the filter compared to a case in which the entire supply of base liquid is pre-filtered, for example.

Filtration systems according to another aspect of the disclosure may provide for easy integration and retrofit with state-of-the-art cartridge-based portable hydration and flavoring systems. The filtration systems may include a cavity or receptacle for accommodating at least a portion of a flavor cartridge and isolating the filter cartridge inlet port or ports such that during dispensing, base liquid must pass through the filter to enter the cartridge ports. This ensures that only filtered base liquid is used in the flavored beverage dispensed to the user.

Filtration systems according to another aspect of the disclosure may provide filtration of a suitable volume of base liquid, at a suitable flow rate, with minimal pressure drop in order to ensure minimal impact to the flavoring performance of the additive (flavor) delivery device. The filtration systems may include an annular charcoal filter cloth supported on an internal support frame, providing suitable filtering surface area to filter base liquid at the flow rates typically utilized with state-of-the-art cartridge systems.

Filtration systems may be provided to be easily and removable installed on existing delivery systems. In one example, a rotating, locking interface is provide to facilitate easy installation by a user onto a container lid, with the filtration assembly and container lid forming a threaded receptacle for securing a flavor cartridge.

According to an aspect, a filter assembly for use with a cartridge-based additive delivery system, the additive delivery system having a cartridge adapted to be secured to a container lid, the cartridge having at least one cartridge base liquid entry port for receiving base liquid, may comprise a filter element defining an interior space adapted to enclose the at least one cartridge such that base liquid must flow through the filter element to enter the cartridge base liquid entry port; and a container lid interface for securing the filter assembly to the container lid.

According to a further aspect, the filter assembly may comprise a filter support frame for retaining the filter element on the filter assembly, the filter support frame defining an interior space adapted to receive and surround at least a portion of the cartridge. According to a further aspect, the filter assembly may comprise an end cap cooperating with the filter support frame for retaining the filter element thereon. According to a further aspect, the container lid interface may include a bayonet connection for securing the filter assembly to the lid. According to a further aspect, the filter assembly may comprise a filter cage adapted to at least partially enclose the filter element. According to a further aspect, the filter cage may be secured to the filter support frame with a snap fitting. According to a further aspect, the filter assembly may comprise a container lid assembly for supporting the filter assembly and for enclosing a container of base liquid. According to a further aspect, the container lid assembly may include a filter retaining adapter for securing the filter assembly on the lid assembly. According to a further aspect, the container lid interface may include at least one cantilevered projection adapted to provide a tactile indication of a positive installation position of the filter assembly on a container lid. According to another aspect, the filter element may be comprised of a charcoal filter. According to a further aspect, the filter element may be an annular cylinder. According to a further aspect, the filter assembly may further comprise a container lid and a flavor cartridge secured to the container lid, the flavor cartridge containing an additive supply, wherein the filter assembly at least partially encloses the flavor cartridge and the additive supply.

According to a further aspect, a method of assembling a filter assembly for a cartridge-based additive delivery system may comprise providing a support frame having a container lid interface for securing the filter assembly to a container lid; securing a filter element to the support frame; and securing an end cap to the support frame to retain the filter element thereon. According to a further aspect, the method may further comprise securing the end cap to the support frame using a snap fitting. According to a further aspect, the secured filter element may be a cylindrical element. According to a further aspect, the filter element may be adapted to at least partially enclose a flavor cartridge.

According to a further aspect, a method of assembling a filter assembly on a cartridge-based additive delivery system may comprise securing an additive cartridge to a container lid; securing a filter assembly to the container lid; and installing the container lid on a container containing a base liquid. According to a further aspect, the method of assembling a filter assembly may comprise enclosing at least part of the additive cartridge within the filter assembly.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto. In the following descriptions of the figures, all illustrations pertain to features that are examples according to aspects of the instant disclosure, unless otherwise noted.

DETAILED DESCRIPTION

Figure 1:
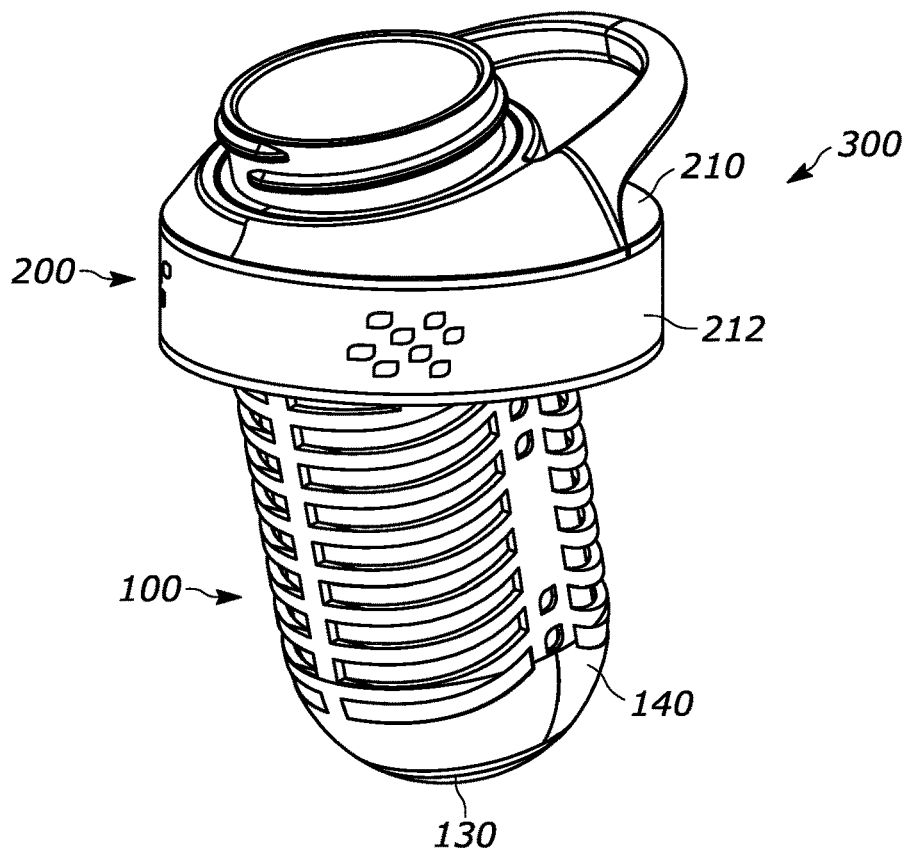
FIG. 1 is a perspective of a lid and filter assembly.
Figure 2:
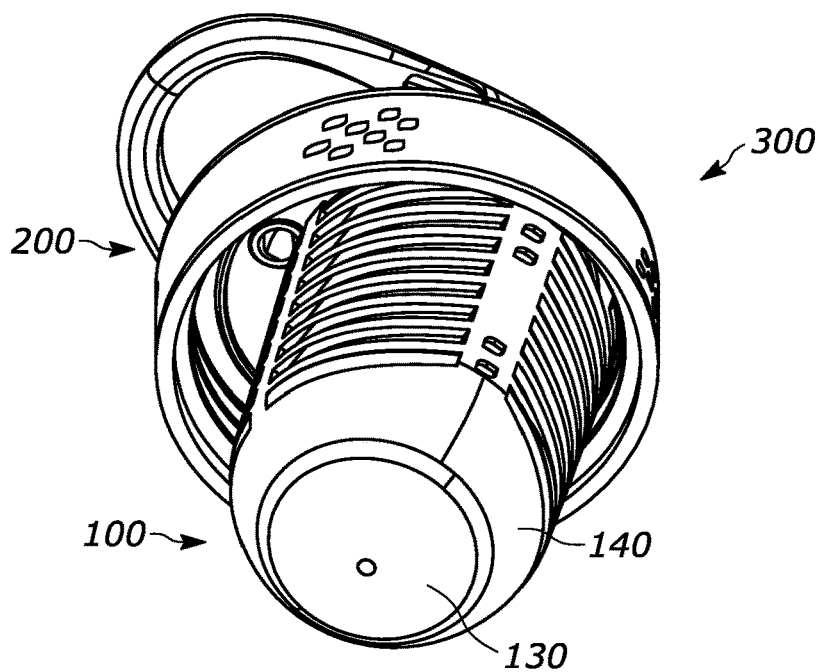
FIG. 2 is another perspective of the lid and filter assembly of FIG. 1

Details of example embodiments of a container lid assembly and filter assembly are shown in FIGS. 1-12. Referring to FIGS. 1 and 2, these are perspective views that illustrate an assembled example filter and container lid combination 300, including an example filter assembly 100 and an example container lid assembly 200 according to aspects of the disclosure. Lid assembly may include a lid base 210 having a gripping band or surface 212 extending around a skirt portion thereof. Filter assembly 100 may include an exterior filter cage 140 and an end cap 130. Further details of the components of the filter assembly 100 and lid assembly 200 will be described below.

Figure 3:
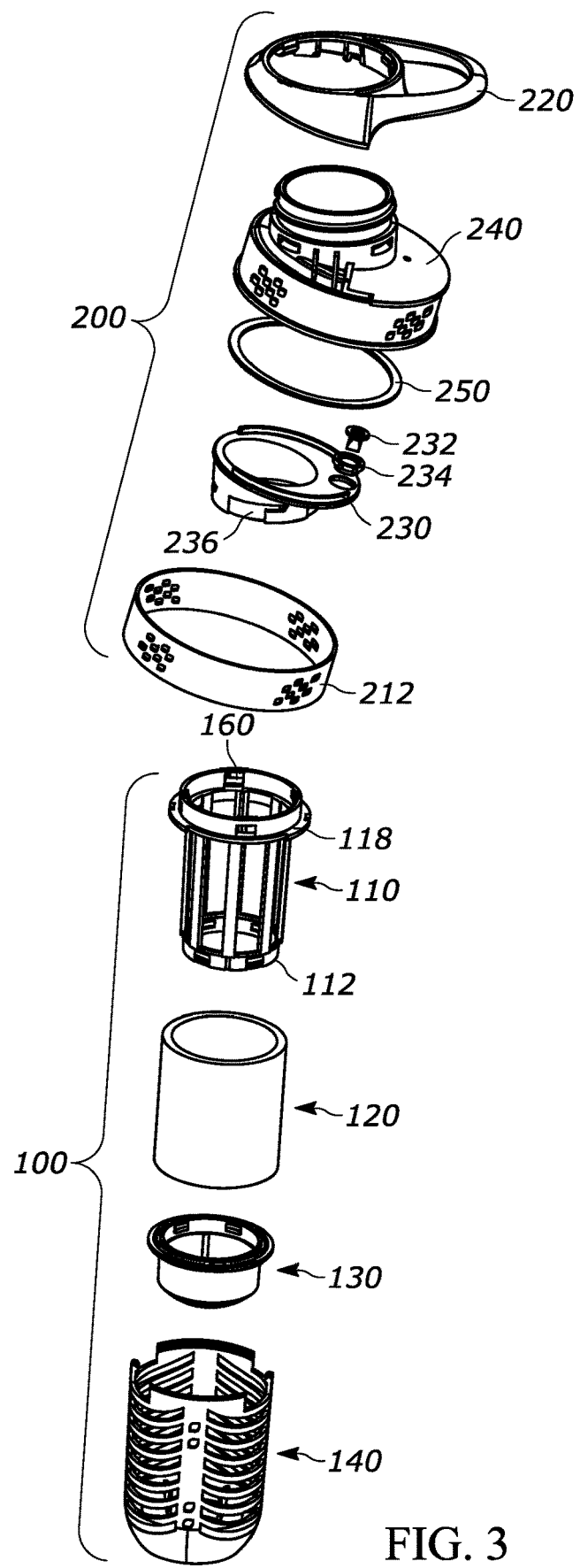
FIG. 3 is an exploded perspective of the lid and filter assembly of FIG. 1.
Figure 4:
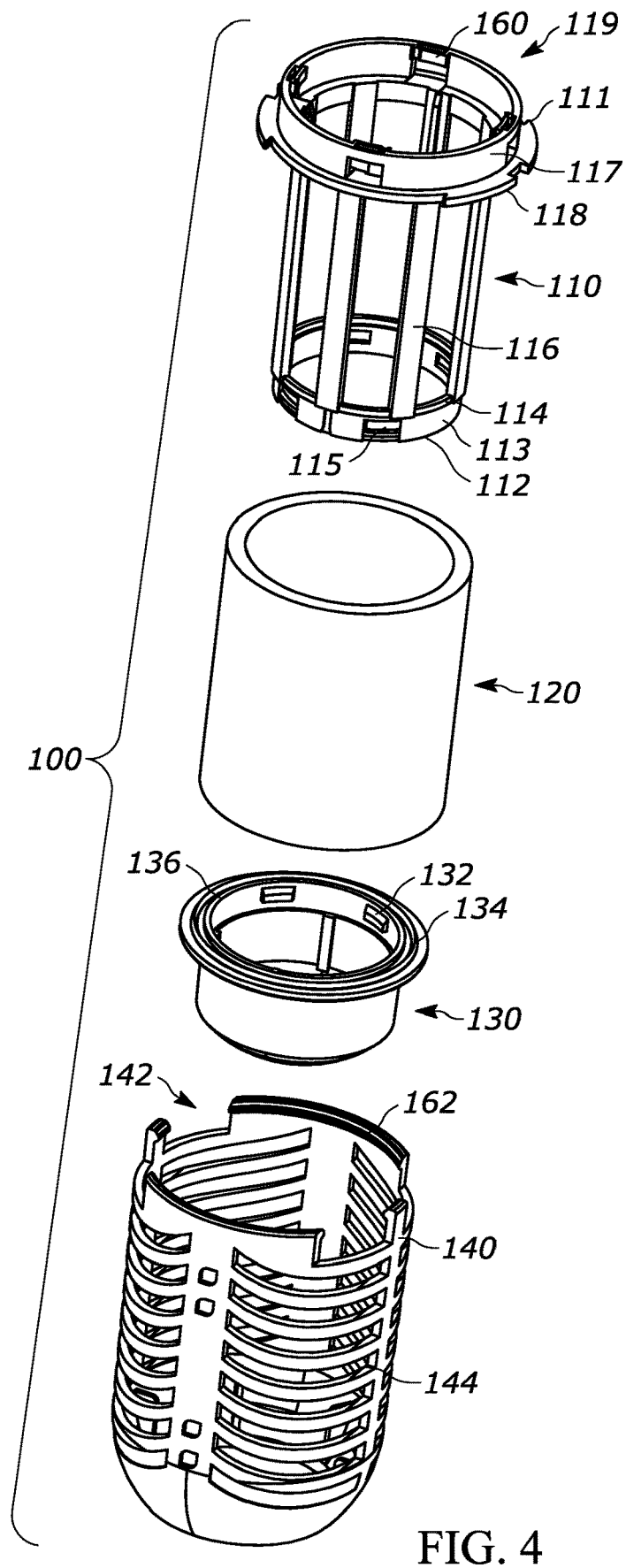
FIG. 4 is an exploded perspective view of the filter assembly of FIG. 1.
Figure 5:
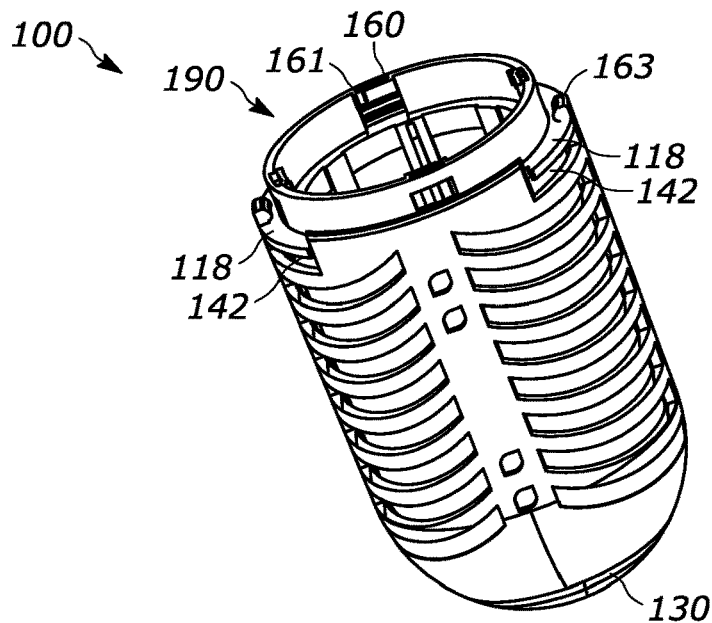
FIG. 5 is a perspective of the assembled filter assembly of FIG. 4.
Figure 6:
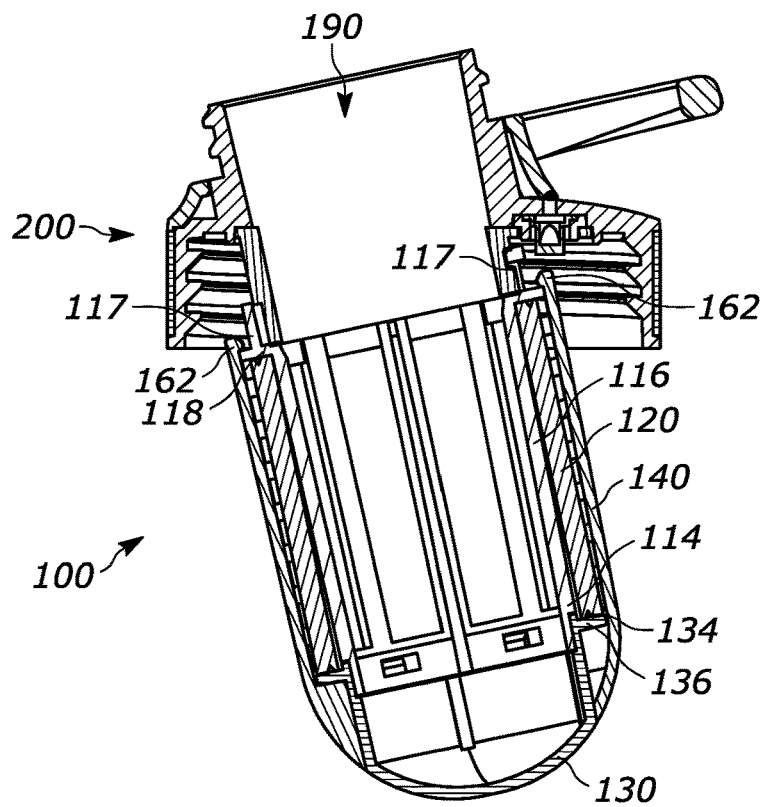
FIG. 6 is cross-section of the assembled filter and lid assembly of FIG. 1.

Referring additionally to FIGS. 3 and 4, an example filter assembly 100 may include an internal support frame 110, which may support a filter element 120 thereon. Support frame 110 may include a first (bottom) end 112 including an annular bottom ring 113 having a number of recesses 115 formed therein. Recesses 115 may provide for snap fitting of an end cap 130 to the filter support frame 110. A number of radially disposed struts 116 extend from the annular bottom ring 113 to an upper annular ring 117, which includes a lid connection interface 119 comprising a number of inwardly extending projections or tabs 160, which may be cantilevered elements that interact with a "bayonet" type locking slots 236 on the lid assembly 200. Lid connection interface 119 functions to connect the support frame 110 and the filter assembly 100 to the lid assembly 200, as will be described. Upper annular ring 117 also includes a radially outward extending flange 118 having a number of projections 111 thereon for cooperating and aligning with an upper portion of outer filter cage 140. The filter cage may have a like number of complementarily shaped recesses 142 defined thereon for receiving the projections 111 and ensuring proper alignment of the filter cage 140 with the support frame 110. This ensures consistent flow rates and patterns through the filter cage structure and through the support frame structure. Filter cage 140 also includes an upper, inwardly extending retaining lip 162 adapted to provide a snap fit with the outward extending flange 118 to retain the filter cage 140 on the support frame 110.

An end cap 130 may engage a first end 112 of the support frame 110 and may include projecting tabs 132, which engage complementarily-shaped recesses 115 on the annular ring 113 of support frame 110 for a snap fit. End cap 130 may include an annular outer ridge or shoulder 134, which supports and retains filter element 120 on the support frame 110. End cap 130 also includes an inner ridge 136 which may form a seal with and engage a lower shoulder 114 on the support frame 110.

Filter element 120 may be a flexible, annular woven charcoal filter shaped as an annular cylinder and sized to fit snugly on the support frame 110. As will be recognized from this disclosure, and described further below, the filter element is adapted to surround, enclose or envelop at least a portion of the flavor cartridge such that all base liquid flowing from the container to the cartridge must pass through the filter element. It is preferable that the filter element have sufficient surface area and permit adequate flow volume of base liquid therethrough while minimizing the pressure drop across the filter element in order to minimize impact to the flavoring performance of the flavor cartridge.

Figure 12:
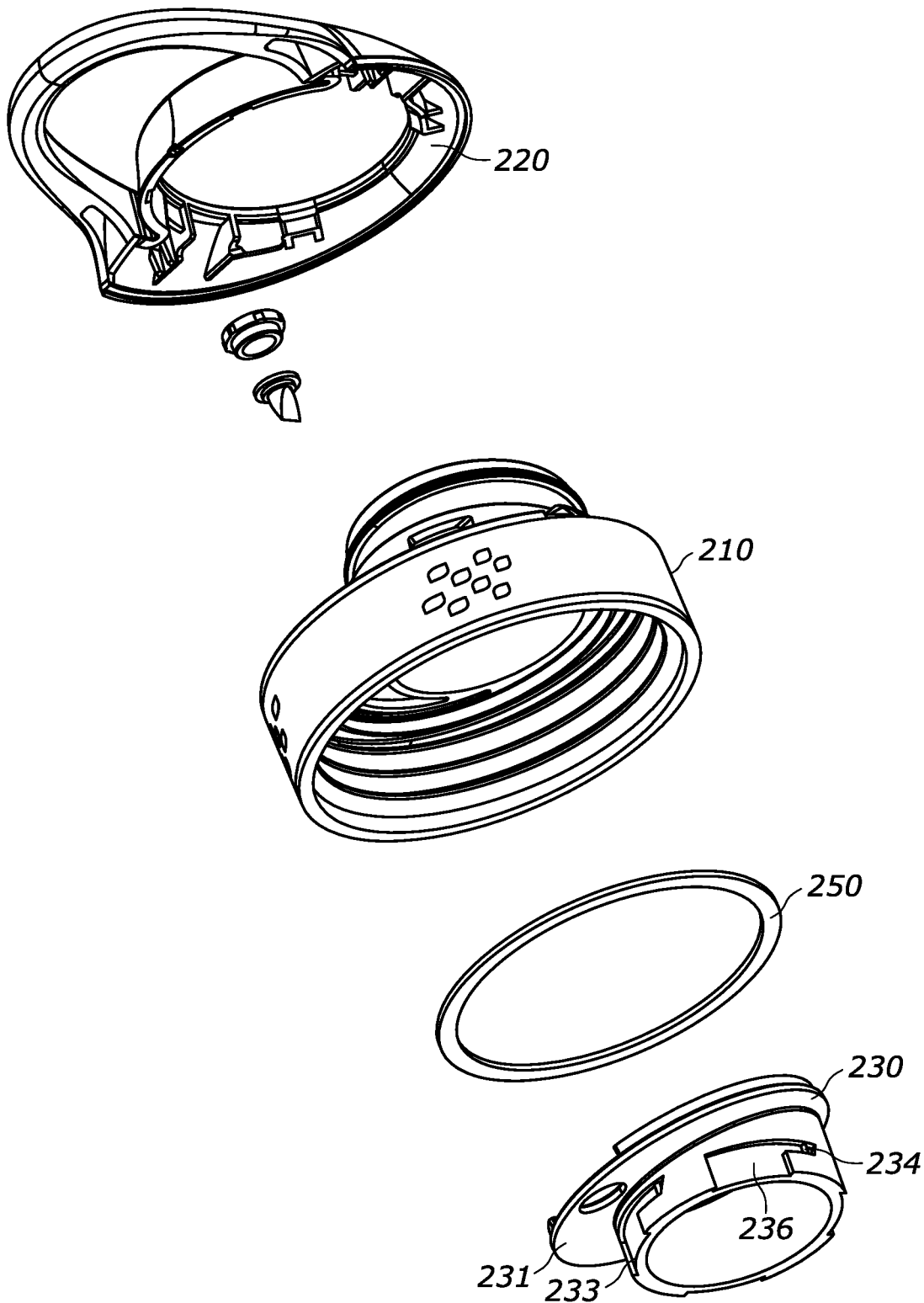
FIG. 12 is an exploded view of the lid assembly of FIG. 1.

Referring additionally to FIG. 12, lid assembly 200 may include a lid base 210, having a threaded skirt for engaging a base liquid container. Lid base 210 may have a snap fit handle 220 secured thereto. A sealing gasket 250 may be installed on the lid base 210 for sealing with a base liquid container. A filter retaining adapter 230 may include an upper flange 231, which may be secured to an underside of the lid base 210 with a snap fit, and may also include a bayonet-type retaining collar with cutouts 236, which may provide an interface for securing the filter assembly 100 to the lid assembly 200, as will be described. A one-way vent 232, which may be a silicone duck bill valve, may be provided on the lid 200 and secured with a retainer 234 to permit air to enter the interior of a base liquid container, while preventing the flow of liquid out of the container. A gripping band 212 may be an elastomeric band and may be received in a recess formed in the lid base 210.

Figure 7:
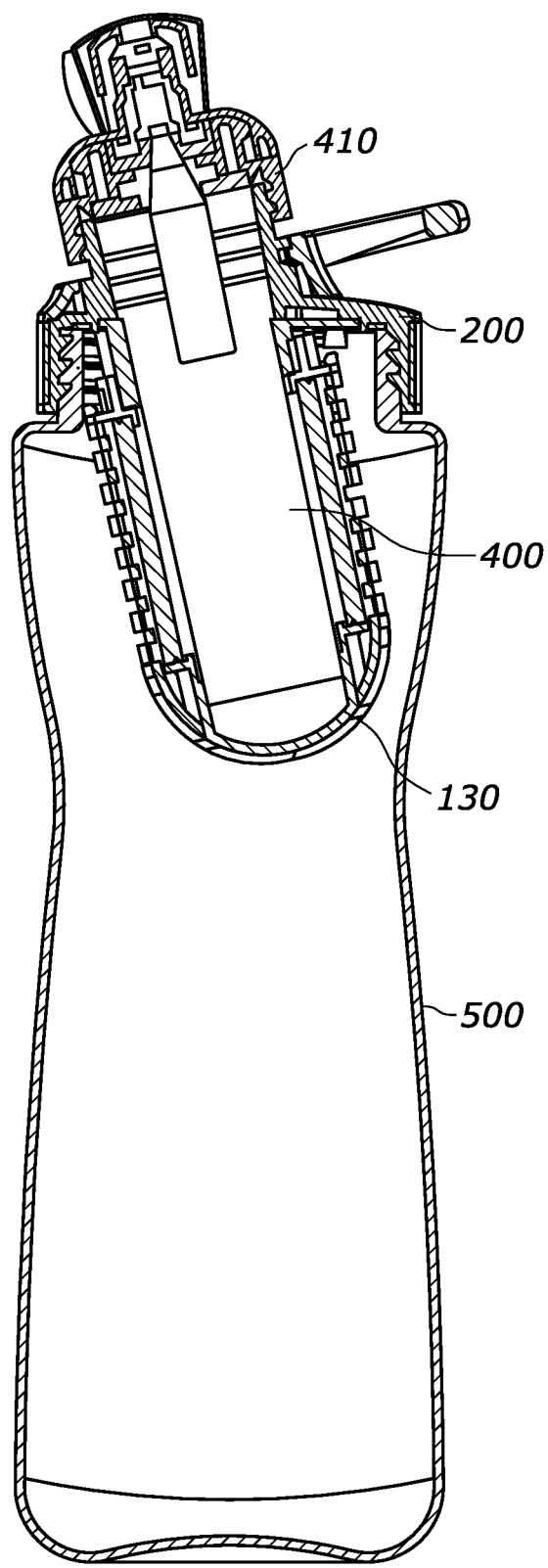
FIG. 7 is a cross section of an assembled filter and lid assembly of FIG. 1 in combination with a cartridge and container.

Assembly of the filter assembly 100 may begin with placement of the filter 120 on the filter cage 110 to an extent that the upper edge of the filter 120 abuts the flange 118. End cap 130 may then be snap fit on the lower end of support frame 110, with the lower end of filter 120 engaging the shoulder 134 and filter 120 being retained on the support frame 110. An outer filter cage 140 may then be installed on the filter/support member/end cap subassembly, with the support frame projections 111 aligned with corresponding ones of the recesses 142 and lip 162 providing a snap fit engagement with the flange support frame flange 118. Filter cage 140 may include a lower circular cutout 142 for engaging and receiving end cap 130 when filter cage 140 is installed on the support frame 110. An outer surface of end cap 130 may form a flush fit with a bottom outer surface of the filter cage 140 as best seen in FIG. 7. End cap 130 may also provide sealing engagement with the bottom of filter cage 140 to prevent the flow of base liquid via the end cap/filter cage interfacing surfaces and to thus ensure that the only flow path for base liquid to interact with the flavor cartridge is through filter element 120. Filter cage 140 also includes a number of cutouts 144 which provide flow paths for the base liquid through the filter cage 140 to the filter element 120 and through the support frame 110 into the interior cavity of the filter assembly 100. Cutouts 144 may be shaped and arranged to provide for desirable flow characteristics and flow volume of base liquid from the base liquid container to the flavor cartridge, which will be partially housed within the filter assembly 100 when the beverage system is fully assembled. As will be recognized, when assembled, the support frame 110 and end cap 130 may form an internal cavity or receptacle 190, surrounded by the filter element 120, for receiving a lower end of an additive or flavor cartridge, as will be described. That is, the internal receptacle 190 defines a cartridge receiving space, which is completely surrounded by the annular filter element 120, thereby ensuring that any base liquid that interacts with or flows through the cartridge, i.e., via the cartridge base liquid inlet ports, must first flow through the filter element 120.

According to aspects of the disclosure, installation of the filter assembly 100 on the container lid 200 may be done quickly and easily by a user with a coupling and twisting motion of the filter assembly 100 relative to the lid 200. Referring additionally to FIGS. 5, 6 and 9-11, filter retaining adapter 230 may include a filter connection interface which may be a "bayonet" type connector integrated thereon, which may include a number of generally inverted "L-shaped" cutouts 236 (FIGS. 3 and 12) on an outer surface of an annular collar 233 extending from the upper flange 231. The number of cutouts 236 may correspond to the number of projecting tabs 160 on the support frame 110. The projections 160 on the support frame 110 may be cantilevered, resilient elements, each with a recess 161 on an end thereof. The cutouts 236 on the filter connection interface of the lid 100 may include a correspondingly shaped projection 237 (FIG. 12).

FIG. 7 illustrates a cross-sectional view of filtration system according to aspects of the disclosure in combination with a flavor cartridge 400 and base liquid container 500. Cartridge 400 may include one or more base liquid entry ports thereon for permitting flow of base liquid into the cartridge. Cartridge 400 may be installed on the lid 200 using a threaded cap 410 on the cartridge which may engage a threaded collar on the lid 200. A bottom portion of the cartridge 400 extends into the receptacle defined in part by the interior of the support frame 110 and end cap 130. FIG. 7 shows the general form factor for example flavor cartridges that may be used with the example lid and filter assemblies as disclosed herein. Flavor cartridges used with the filtration system may have attributes of the cartridges and additive delivery systems described in US Patent Publication No. 20170296988, published on Oct. 19, 2017, titled ADJUSTABLE ADDITIVE CARTRIDGE SYSTEMS AND METHODS, the subject matter of which is incorporated herein by reference in its entirety.

When container 500 is inverted, base liquid (water) may flow through the filter cage 140 to interact with the cartridge 400. Water flow proceeds through the cutouts 144 in the filter cage and through the filter element 120 to the interior receptacle defined by the support member 110 and interior of filter element 120. Filtered water may then flow in a space defined between a cartridge outer casing and the interior of filter 120 to ports in the cartridge 400. Flow may be towards the cartridge cap 410 where the filtered water may enter into a mixing zone defined in the cartridge where the water is mixed with a flavoring concentrate stored in the cartridge, as the water flows through the cartridge, and then the mixed beverage dispensed out through a spout on the cartridge. The cartridge 400 may have at least one inlet port on a bottom portion thereof to permit entry of base liquid to the cartridge in a base liquid flow path that extends to the mixing zone.

As will be recognized, water is filtered as it is drawn through the cartridge and as mixed beverage is dispensed (drank) from the base liquid container. Thus, both filtration and flavoring of the base liquid occur in response to base liquid flowing from the container and through the cartridge. Water is thus filtered only while it is being dispensed and mixed with the flavoring. The supply of base liquid in the container remains unfiltered and unflavored until it is dispensed from the container and consumed by the user.

Figure 8:
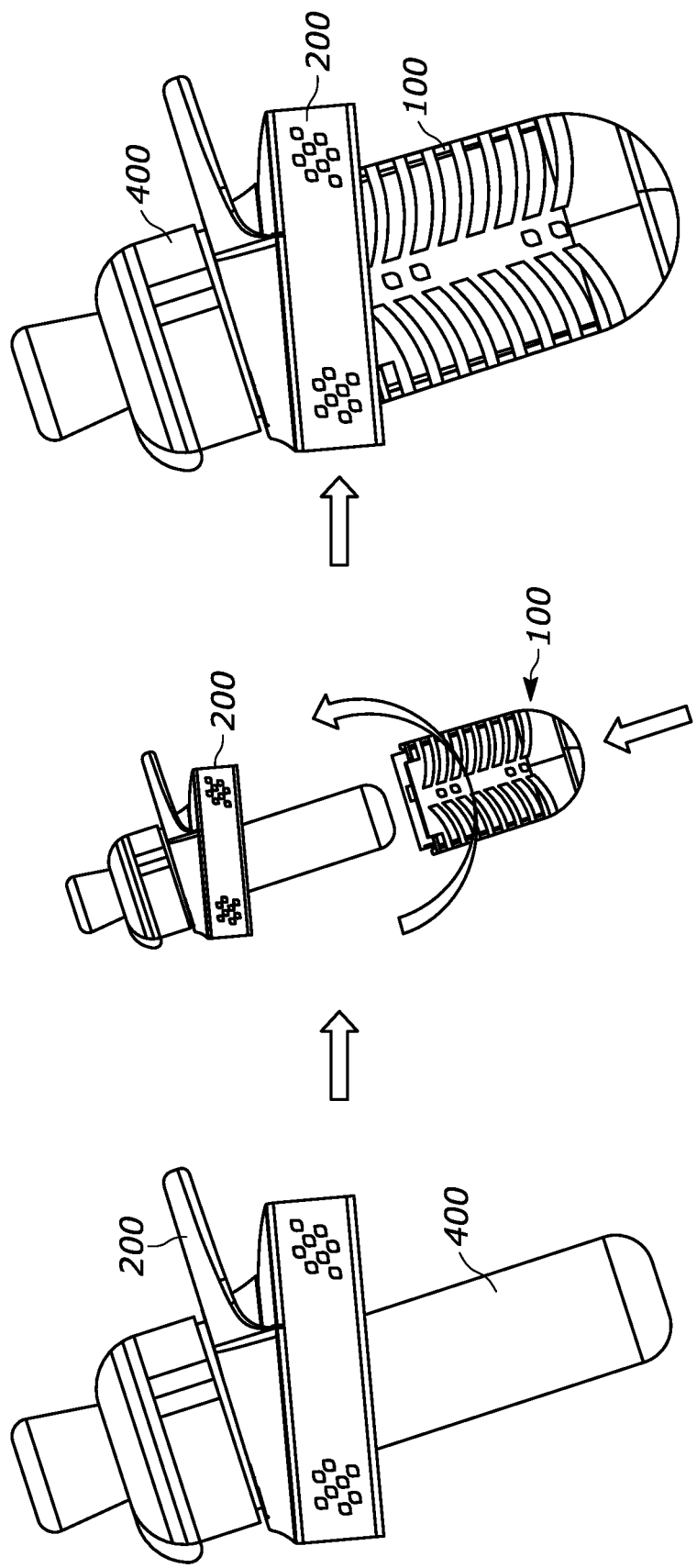
FIG. 8 is a pictorial illustration of a method of installing a filter assembly on a lid having a cartridge thereon.
Figure 9:
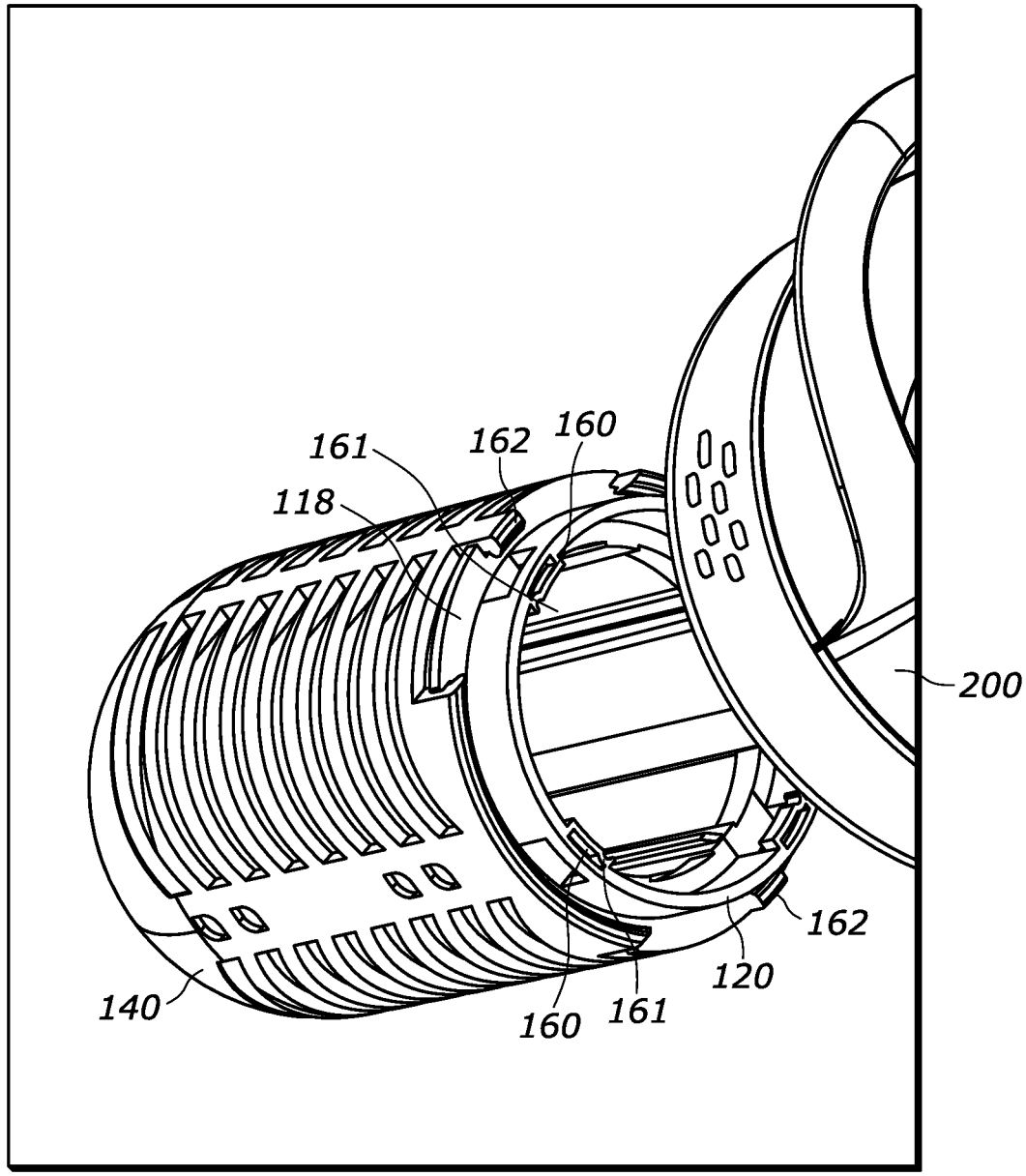
FIG. 9 is another detailed perspective of mounting details for the filter assembly of FIG. 1.
Figure 10:
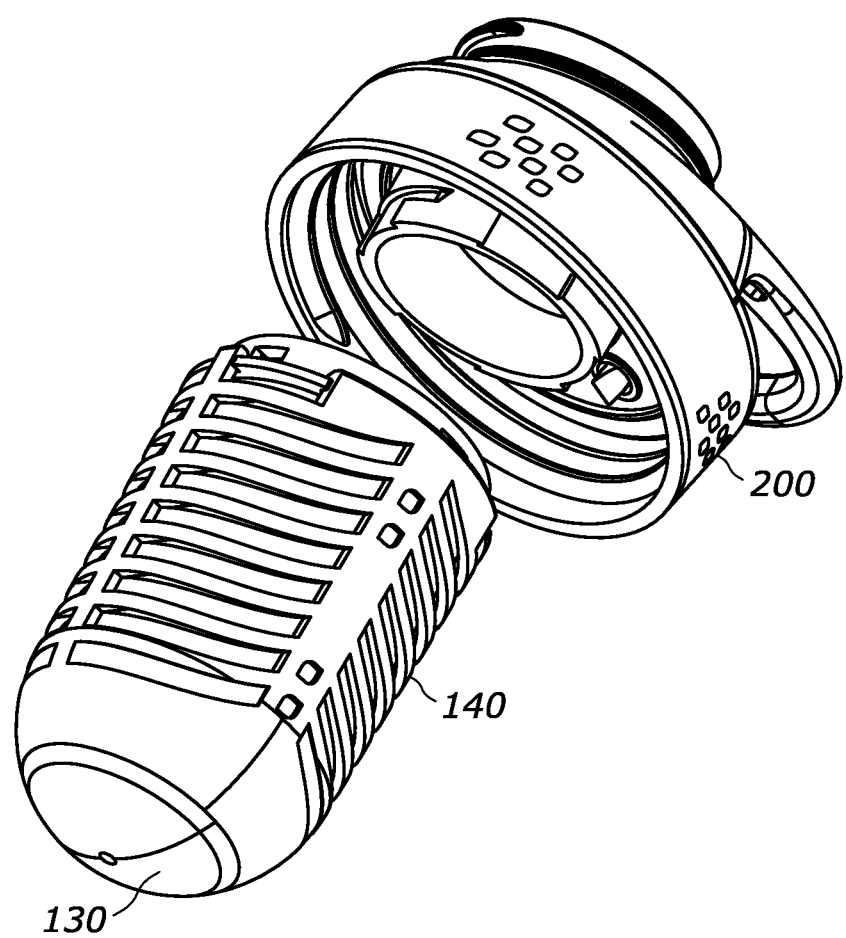
FIG. 10 is a perspective of the lid assembly and filter assembly of FIG. 1.
Figure 11:
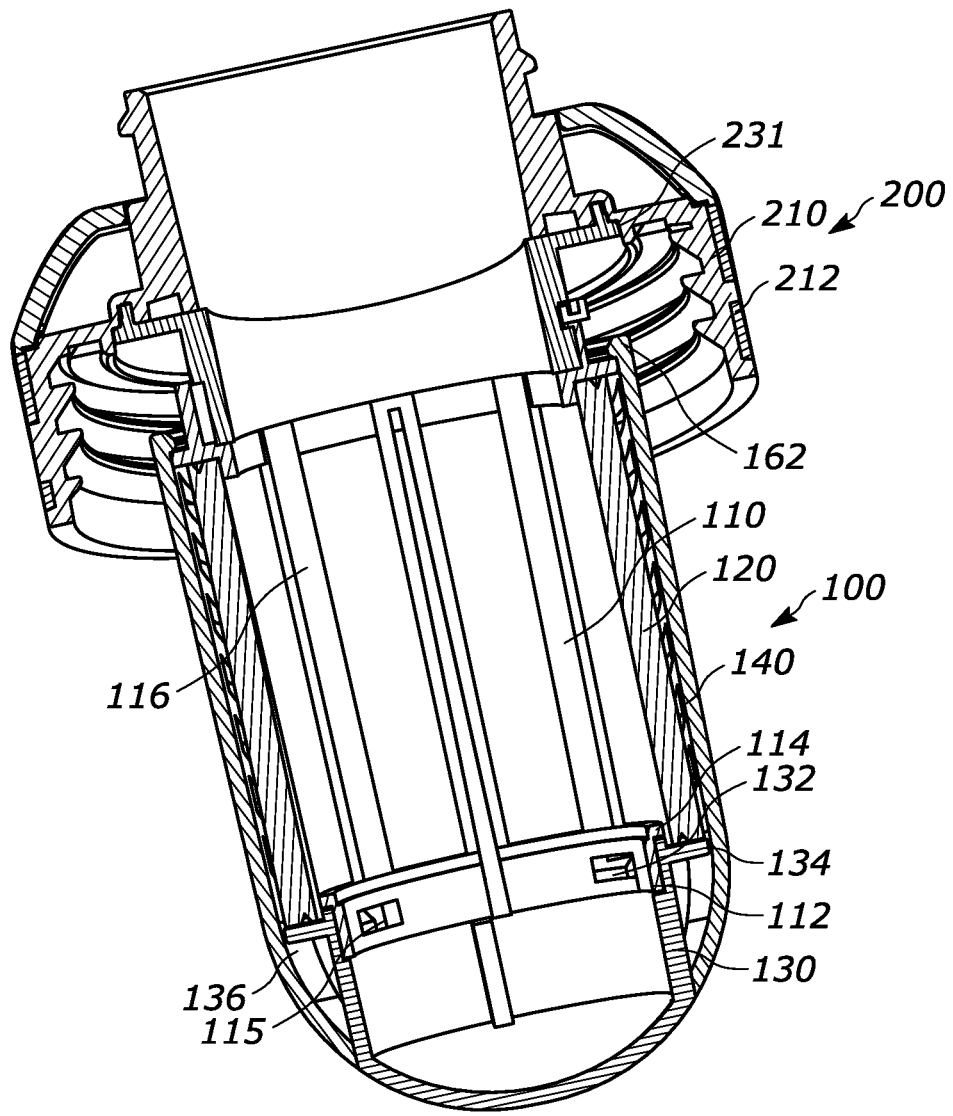
FIG. 11 is a cross-section of the assembled filter and lid assembly of FIG. 1.

Referring additionally to FIG. 8, this figure schematically illustrates an example method that may be undertaken by a user to install a filter assembly 100 on a lid assembly having a cartridge 400 already secured thereto. To install the filter assembly 100 on the lid, a user may align the upper end of support frame 110 with annular collar 233 and align projections 160 with the cutouts 236 on the lid, slide the filter assembly onto the annular collar 233, and twist the filter assembly 100 relative to the lid 200. The recess 161 on each projection 160 will click into place when they engage the projections 237. This interaction may provide sensory (tactile and auditory) indication to the user that the filter assembly has been properly installed.

Another advantage of the configurations described herein is that the filter element never encounters mixed beverage and thus remains exposed only to the base liquid (water), which prevents contamination or clogging of the filter that might be caused by exposure to the flavoring concentrate, which thus prolongs filter life.

Another advantage of the configurations described herein is that the filter cage may provide an attractive aesthetic quality to the lid/cartridge/container assembly combination, with portions of the filter element being visible through the filter cage cutouts. In addition to providing a filtered water supply to the cartridge as base liquid is mixed with and dispensed through the cartridge, the filter aesthetic also improves user perception of the available filtering function and may enhance user enjoyment of the dispensed beverage.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An assembly for use with a cartridge-based additive delivery system including:
    a container lid configured to engage with a container having base liquid, the container lid having a lid base with an upper side opposite a lower side, an upper collar on the upper side of the lid base and a lower collar on the lower side;
    a cartridge adapted to be secured to the upper collar of the container lid, the cartridge having at least one cartridge base liquid entry port for receiving the base liquid and a flavoring concentrate for mixing with the base liquid to form a mixed beverage; and
    a filter assembly comprising:
        a filter element defining a filter element interior space; and
        a filter support frame defining a filter support frame interior space adapted to receive and surround at least a portion of the cartridge, the filter support frame including a container lid interface adapted to removably secure the filter assembly to the lower collar of the container lid.

2. The assembly of claim 1, wherein the filter support frame includes an annular bottom ring, an annular top ring and a plurality of struts extending between the annular bottom ring and the annular top ring.

3. The assembly of claim 1, further comprising an end cap cooperating with the filter support frame, the end cap being adapted to retain the filter element on the filter support frame.

4. The assembly of claim 1, wherein the container lid interface includes a bayonet connection for securing the filter assembly to the container lid.

5. The assembly of claim 1, further comprising a filter cage adapted to at least partially enclose the filter element.

6. The assembly of claim 5, wherein the filter cage is secured to the filter support frame with a snap fitting.

7. The assembly of claim 1, wherein the filter support frame is configured to fit within the filter element interior space.

8. The assembly of claim 1, wherein the container lid includes a filter retaining adapter for securing the filter assembly on the container lid.

9. The assembly of claim 1, wherein the container lid interface includes at least one cantilevered projection adapted to provide a tactile indication of a positive installation position of the filter assembly on the container lid.

10. The assembly of claim 1, wherein the filter element is comprised of a charcoal filter.

11. The assembly of claim 1, wherein the filter element is an annular cylinder.

12. The assembly of claim 1, wherein the cartridge is secured to the container lid and the filter assembly at least partially encloses the cartridge.

13. A method of assembling a filter assembly for a cartridge-based additive delivery system comprising;
    providing a filter support frame having a flange and a container lid interface for securing the filter assembly to a container lid, the flange and container lid interface being at an upper end of the support frame;
    securing a filter element to the filter support frame by positioning the filter element over the support frame such that an upper edge of the filter element abuts the flange and such that the filter support frame extends into an interior space of the filter element; and
    securing an end cap to a lower end of the support frame to retain the filter element on the filter support frame.

14. The method of claim 13, further comprising securing the end cap to the support frame using a snap fitting.

15. The method of claim 13, wherein the filter element is a cylindrical element.

16. The method of claim 13, wherein the filter element is adapted to at least partially enclose a flavor cartridge.

17. A method of assembling a filter assembly on a cartridge-based additive delivery system comprising:
    securing an additive cartridge to an upper side of a container lid;
    securing a filter assembly to a lower side of the container lid, the lower side being opposite from the upper side of the container lid; and
    installing the container lid on a container containing a base liquid such that the filter assembly and the lower side of the container lid are exposed to the base liquid.

18. The method of assembling a filter assembly of claim 17, further comprising enclosing at least part of the additive cartridge within the filter assembly.

19. The method of assembling a filter assembly of claim 17, further comprising generating an audible or tactile indication when the filter assembly is installed on the container lid.

20. The method of assembling a filter assembly of claim 17, further comprising enclosing at least part of the additive cartridge within a filter cage.

21. The method of claim 17, wherein securing the additive cartridge includes extending a lower portion of the additive cartridge through an opening of the container lid such that the lower portion is positioned on the lower side of the container lid.

22. The method of claim 17, further comprising removing the additive cartridge from the container lid without removing the filter assembly from the container lid.

23. The assembly of claim 1, wherein the lid base includes an opening through the lid base, and wherein the cartridge is configured to extend through the opening and into the filter element interior space when secured to the upper collar.

24. The assembly of claim 1, wherein the cartridge and the filter assembly are configured such that the filter element never encounters mixed beverage and is exposed only to the base liquid.

* * * * *